US009754390B2

(12) United States Patent
Heigl et al.

(10) Patent No.: US 9,754,390 B2
(45) Date of Patent: *Sep. 5, 2017

(54) RECONSTRUCTION OF TIME-VARYING DATA

(71) Applicants: Siemens Medical Solutions USA, Inc., Malvern, PA (US); Siemens Aktiengesellschaft, Munich (DE)

(72) Inventors: Benno Heigl, Coburg (DE); Markus Kowarschik, Nuremburg (DE); Christopher Rohkohl, Hattingen (DE); Kevin Royalty, Fitchburg, WI (US); Sebastian Schafer, Madison, WI (US); Jurgen Endres, Erlangen (DE)

(73) Assignee: Siemens Healthcare GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,288

(22) Filed: Aug. 10, 2016

(65) Prior Publication Data

US 2016/0350948 A1    Dec. 1, 2016

Related U.S. Application Data

(63) Continuation of application No. 14/302,596, filed on Jun. 12, 2014, now Pat. No. 9,443,330.

(60) Provisional application No. 61/838,928, filed on Jun. 25, 2013.

(51) Int. Cl.
  G06K 9/00       (2006.01)
  G06T 11/00      (2006.01)
(52) U.S. Cl.
  CPC ........ G06T 11/008 (2013.01); *G06T 2200/04* (2013.01); *G06T 2211/412* (2013.01)

(58) Field of Classification Search
None
See application file for complete search history.

(56) References Cited

U.S. PATENT DOCUMENTS

| 8,929,632 B2 * | 1/2015 | Horz ............... A61B 6/481 |
| | | 382/130 |
| 2011/0038517 A1 * | 2/2011 | Mistretta ........ A61B 6/02 |
| | | 382/128 |
| 2012/0150048 A1 * | 6/2012 | Kang ............... G06T 7/0085 |
| | | 600/481 |

OTHER PUBLICATIONS

Giordano, M., Vonken, EPA, Bertram, M, MAli WPTM, Viergever, MA, Neukirchen, C. "Spatially regularlized region-based perfusion estimation in peripherals using angiographic C-arm systems" Physics in Medicine and Biology 57 (2012).*
Copeland, Andrew D, Mangoubi, Rami S, Desai, Mukund N, Mitter, Sanjoy L, Malek, Adel M. "Spatio-Temporal Data Dusion for 3D+T Image Reconstruction in Cerebral Angiography" IEEE Transactions on Medical Imaging vol. 29 No. 6 Jun. 2010.*

* cited by examiner

*Primary Examiner* — Edward Park
*Assistant Examiner* — Molly Delaney

(57) ABSTRACT

Systems and methods are provided for data reconstruction. In accordance with one aspect, data interpolation is performed on a time-varying three-dimensional (3D) image dataset of one or more vessel-like structures to generate at least one interpolated voxel value. The interpolated voxel value is used to correct at least one value of a vessel voxel representing the one or more vessel-like structures in the time-varying 3D dataset.

27 Claims, 12 Drawing Sheets

RECONSTRUCTION OF TIME-VARYING DATA

CROSS-REFERENCE TO RELATED APPLICATION

The present application is a continuation application and claims the benefit of U.S. provisional application No. 61/838,928 filed on Jun. 25, 2013, and the pending U.S. non-provisional application Ser. No. 14/302,596 filed on Jun. 12, 2014, the entire contents of which are herein incorporated by reference.

TECHNICAL FIELD

The present disclosure generally relates to image data processing, and more particularly to reconstruction of time-varying data.

BACKGROUND

Angiography is a common method used to represent blood vessels based on diagnostic imaging methods, such as X-ray or Magnetic Resonance Tomography (MRT). For an improved representation of the vessels under examination, Digital Subtraction Angiography (DSA) has been developed. DSA is fluoroscopy technique used in interventional radiology to clearly visualize blood vessels in a bony or dense soft tissue environment. Images are produced by subtracting a 'pre-contrast image' or the mask from subsequent images acquired after the contrast medium has been introduced into a structure or tissue of interest. These images can be used to provide time-resolved or time-varying information that shows the development of the structure or tissue of interest over time.

In current clinical practice, time-resolved information is generally only available in two dimensions. Typically, the surgeon has to perform a two-dimensional (2D) to three-dimensional (3D) mental conversion from the 2D projection images to 3D anatomy in order to assess and diagnose vascular pathologies and blood flow abnormalities. Regardless of acquisition/viewing angle, vessel segments that are overlapping and/or obscured may therefore be compromised, leading to potentially missing image information or incorrect diagnosis. Problems include, for example, vessel overlap or vessels running orthogonal to the detector plane.

Vascular filling may be visualized using single-plane or bi-plane 2D DSA image(s). Existing methods may provide acceptable results, but struggle with complex vasculature and occluded vessels, introduction of premature vessel filling and fluctuations in vessel filling. Some traditional techniques use data from static angles instead of the acquisition sequences themselves, which can lead to additional radiation exposure for the patient as well as inaccuracies arising from a corresponding need for highly accurate image registration steps. Other methods are based on simplifying assumptions (i.e., simplified models) concerning the patient's physiology (e.g., periodic cardiac activity) as well as the transport of blood, and mixture of blood and contrast agent, through the patient's vasculature. These may lead to reconstructed flow results that deviate from real flow patterns.

SUMMARY

Described herein are systems and methods for data reconstruction. In accordance with one aspect, data interpolation is performed on a time-varying three-dimensional (3D) image dataset of one or more vessel-like structures to generate at least one interpolated voxel value. The interpolated voxel value is used to correct at least one value of a vessel voxel representing the one or more vessel-like structures in the time-varying 3D dataset.

In accordance with another aspect, time-varying two-dimensional (2D) image dataset of one or more vessel-like structures is received. Temporal volumes in a current estimated time-varying 3D dataset are forward projected, and an error between the current estimated time-varying 3D dataset and corresponding projection data from the time-varying 2D image dataset is determined. Such error may be back projected across the temporal volumes in the current estimated time-varying 3D dataset. A regularization function may then be applied to the current estimated time-varying 3D dataset. Such forward projection, back projection and regularization may be repeated until a terminating condition is met.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1A:
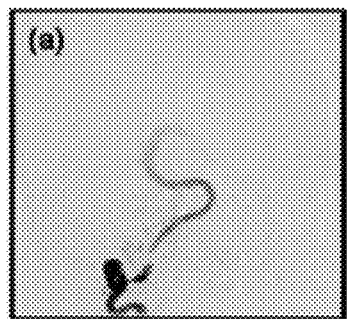
FIGS. 1(a)-(d) show exemplary frames of a single plane 2D time-resolved digital subtraction angiography (DSA) image acquisition.
Figure 1B:
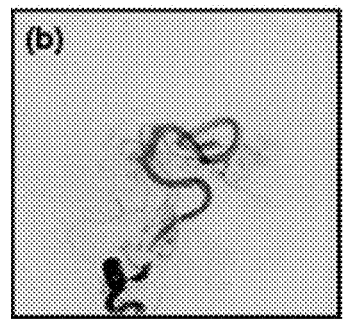
Figure 1C:
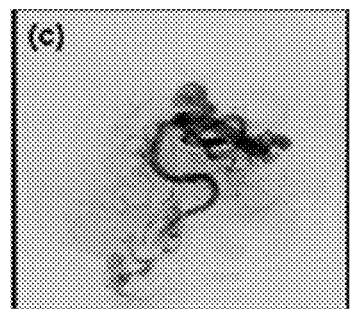
Figure 1D:
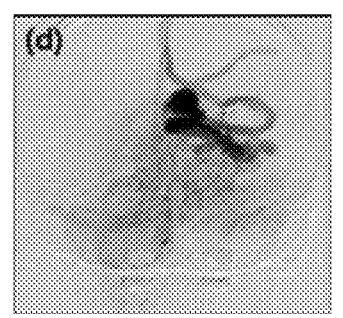

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MRI, PET (positron emission tomography), PET-CT, SPECT, SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images and voxels for 3D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture or a 3D volume. For a 2- or 3Dimensional image, the domain of the image is typically a 2- or 3Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, and "voxels" for volume image elements, often used with respect to 3D imaging, can be used interchangeably. It should be noted that the 3D volume image is itself synthesized from image data obtained as pixels on a 2D sensor array and displays as a 2D image from some angle of view. Thus, 2D image processing and image analysis techniques can be applied to the 3D volume image data. In the description that follows, techniques described as operating upon pixels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel" or "subject voxel" are used to indicate a particular image element as it is operated upon using techniques described herein.

Currently, interventional time-resolved angiographic imaging has been limited to time-resolved 2D digitally subtracted angiography images (DSA). FIGS. 1(a)-(d) shows exemplary frames of a single plane 2D time-resolved digital subtraction angiography image acquisition. The filling of the vasculature changes from frame to frame, leaving the surgeon with the difficult task of interpreting 3D filling from varying 2D snapshots.

Figure 1E:
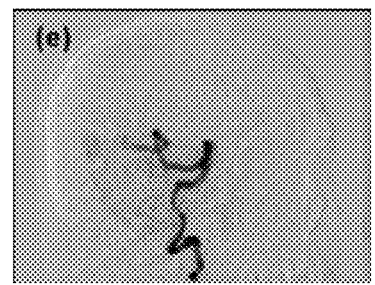
FIGS. 1(e)-(g) show exemplary frames of a projection sequence used in generating 3D DSA reconstructions.
Figure 1F:
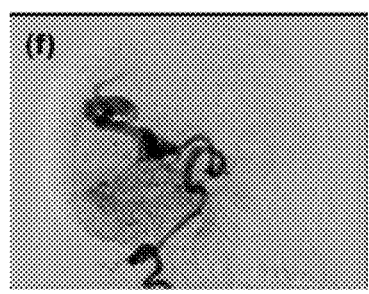
Figure 1G:
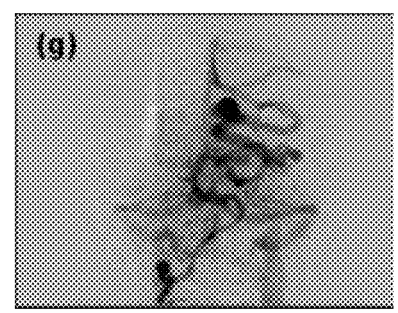
Figure 1H:
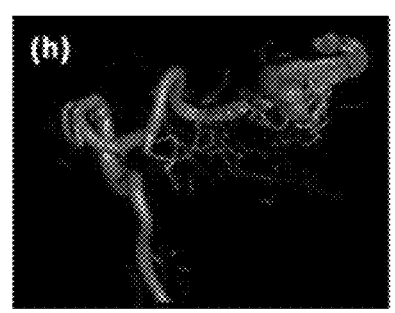
FIG. 1(h) shows a 3D DSA reconstruction of a vasculature.

Recent years have seen the introduction of methodologies for non-time-resolved 3D-DSA. In one method, a mask projection image sequence is first acquired during a rotational scan of the angiographic device, followed by a sequence of rotational fill projection images acquired after the introduction of contrast agent. The mask projection images are subtracted from the fill projection images to generate projection image data that displays a subject's vascular anatomy acquired at different viewing angles. FIGS. 1(e)-(g) show exemplary frames of a projection sequence used in generating 3D DSA reconstructions, where all frames are acquired at different acquisition system angulations. The change in filling from frame to frame is visible. FIG. 1(h) shows a 3D DSA reconstruction of the vasculature. Using 3D reconstruction techniques, a static volumetric dataset of a subject's vasculature can be created. This static reconstruction does not, however, include the change recorded in the acquisition sequence illustrated by FIGS. 1(e)-(g).

One aspect of the present framework determines time-varying volumetric attenuation curves of vessel-like structures of interest, resulting in a 3D plus time (or 3D+t) volumetric dataset that includes the time dimension. Unlike prior work that requires multiple image acquisitions, a single mask-and-fill-run image acquisition may be used in reconstructing the 3D+t dataset. Some implementations reconstruct the 3D+t dataset by applying data interpolation in the spatial and/or time domain on an initial 3D+t volume dataset derived from time- and projection angle-varying data. Confidence values or curves may be used in performing interpolation of time-resolved 3D DSA. Such framework may be applied once, or in an iterative fashion.

Other implementations of the framework dynamically and iteratively reconstruct a 3D+t dataset based on, for example, an initial time-varying 3D projection dataset derived from time-varying 2D projection data acquired at multiple angles. The initial dataset may also be a static non-time-varying 3D DSA dataset. Forward and backward projection may be used to iteratively refine the initial 3D dataset. Unlike other methods that require a constraining volume generated from a 3D DSA dataset, the present techniques may be applied on the initial 3D dataset as it is. These and other exemplary advantages and features will be described in more detail in the following description.

One exemplary application of the present framework is the dynamic reconstruction of a 3D+t dataset that represents the propagation of contrast agent through a vascular network. Such application may be used to, for instance, assess vascular disorders in a patient's brain, such as stenotic vessel segments, fistulas, and arteriovenous malformations (AVMs). Further, it facilitates isolation of different filling phases/duration, thereby allowing easier viewing access to structures of interest. It is understood that while a particular application directed to vascular network visualization may be shown, the technology is not limited to the specific implementations illustrated.

Figure 2:
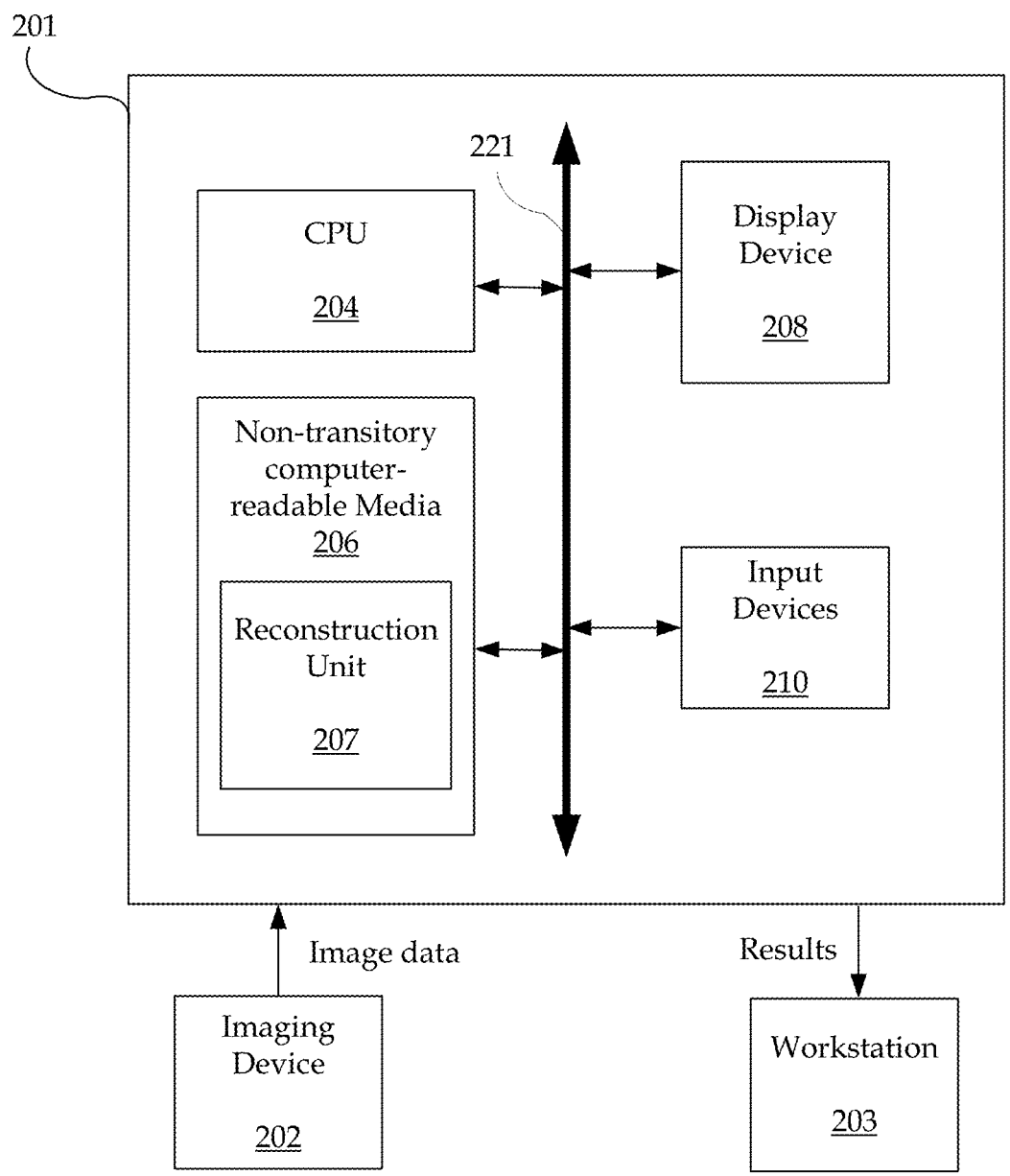
FIG. 2 is a block diagram illustrating an exemplary system.

FIG. 2 is a block diagram illustrating an exemplary system 200. The system 200 includes a computer system 201 for implementing the framework as described herein. Computer system 201 may be a desktop personal computer, a portable laptop computer, another portable device, a mini-computer, a mainframe computer, a server, a storage system, a dedicated digital appliance, a communication device, or another device having a storage sub-system configured to store a collection of digital data items. In some implementations, computer system 201 operates as a standalone device. In other implementations, computer system 201 may be connected (e.g., using a network) to other machines, such as imaging device 202 and workstation 203. In a networked deployment, computer system 201 may operate in the capacity of a server (e.g., thin-client server, such as syngo®. via by Siemens Healthcare), a client user machine in server-client user network environment, or as a peer machine in a peer-to-peer (or distributed) network environment.

In one implementation, computer system 201 comprises a processor or central processing unit (CPU) 204 coupled to one or more non-transitory computer-readable media 206 (e.g., computer storage or memory), display device 208 (e.g., monitor) and various input devices 210 (e.g., mouse or keyboard) via an input-output interface 221. Computer system 201 may further include support circuits such as a cache, a power supply, clock circuits and a communications bus. Various other peripheral devices, such as additional data storage devices and printing devices, may also be connected to the computer system 201.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 206. In particular, the present techniques may be implemented by a reconstruction unit 207. Non-transitory computer-readable media 206 may include random access memory (RAM), read-only memory (ROM), magnetic floppy disk, flash memory, and other types of memories, or a combination thereof. The computer-readable program code is executed by CPU 204 to process images or image data acquired by, for example, imaging device 202. As such, the computer system 201 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 206 may be used for storing image datasets, dynamic reconstruction instructions, knowledge base, individual patient data, database of previously treated patients (e.g., training data), and so forth. Such data may also be stored in external storage or other memories. The external storage may be implemented using a database management system (DBMS) managed by the CPU 204 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 202 may be a radiology scanner, such as an X-ray or a CT scanner, for acquiring image data. The workstation 203 may include a computer and appropriate peripherals, such as a keyboard and display device, and can be operated in conjunction with the entire system 200. For example, the workstation 203 may communicate with the imaging device 202 so that the image data collected by the imaging device 202 can be rendered at the workstation 203 and viewed on a display device.

The workstation 203 may communicate directly with the computer system 201 to display processed image data and/or output image processing results (e.g., dynamic reconstructed 3D+t dataset). The workstation 203 may include a graphical user interface to receive user input via an input device (e.g., keyboard, mouse, touch screen voice or video recognition interface, etc.) to manipulate visualization and/or processing of the image data. For example, the user may view the processed image data, and specify one or more view adjustments or preferences (e.g., zooming, panning, rotating, changing contrast, changing color, changing view angle, changing view depth, changing rendering or reconstruction technique, etc.), navigate to a particular region of interest by specifying a "goto" location, navigate (e.g., stop, play, step through, etc.) temporal volumes of the reconstructed 3D+t dataset, and so forth.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 3:
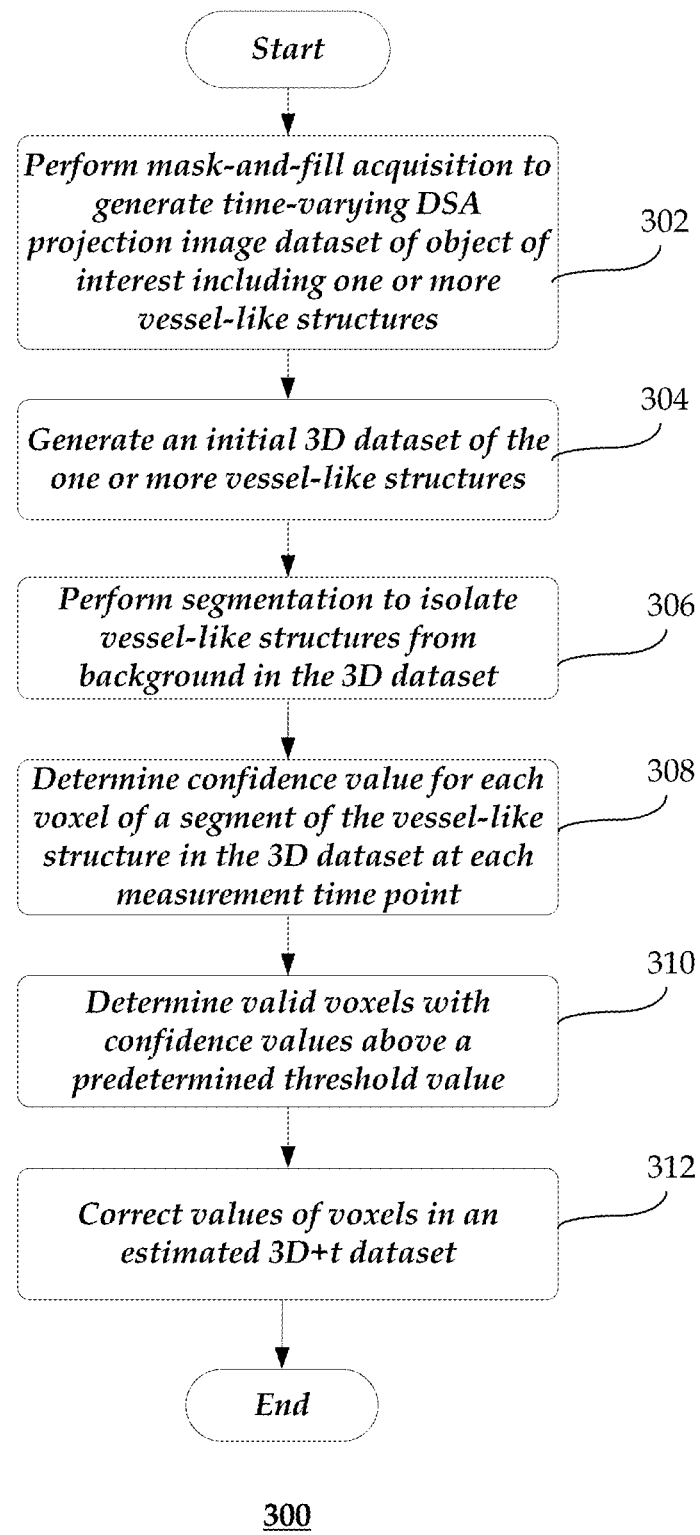
FIG. 3 shows an exemplary method of data reconstruction.

FIG. 3 shows an exemplary method 300 of data reconstruction performed by a computer system. It should be understood that the steps of the method 300 may be performed in the order shown or a different order. Additional, different, or fewer steps may also be provided. Further, the method 300 may be implemented with the system 201 of FIG. 2, a different system, or a combination thereof.

At 302, the imaging device 202 performs a mask-and-fill acquisition to generate a time-varying DSA projection image dataset of an object of interest. The object of interest may be any biological object identified for investigation or examination, such as a portion of a patient's or subject's brain, heart, leg, arm, and so forth. The object of interest includes one or more vessel-like structures (e.g., blood vessels, arteries, vascular tree or network, etc.). The one or more vessel-like structures may be dynamic or time-varying structures that can be filled with a contrast agent or medium for observing its propagation over time.

In some implementations, the time-varying DSA projection image dataset is a set of 2D DSA projection images that is acquired by performing a rotational scan or angular acquisitions using imaging device 202. The imaging device 202 may be, for example, a flat-panel based X-ray scanner that includes at least one pair of X-ray source and X-ray detector. Alternatively, the imaging device 202 may include a rotating CT gantry covering at least one pair of X-ray source and X-ray detector. In other implementations, the imaging device 202 is an MR projection scanner. In yet other implementations, the imaging device 202 is a rotating optical CT gantry covering at least one pair of light source and optical detector. Other types of imaging device 202, such as angular sampling ultrasound, may also be used.

A single mask and fill acquisition may be performed via the imaging device 202. More particularly, a mask image dataset may first be acquired via the imaging device 202 such that it can be subtracted from the corresponding time-varying contrast filled projection image dataset. A mask image is simply an image of the same area before the contrast agent (or medium) is administered to fill the vessel-like structures of the irradiated object of interest that is to be investigated. The actual angular- and time-varying 2D projection data may be based on a contrast enhanced acquisition that is initiated before or after the injection of X-ray contrast medium into the vessel-like structures as the first inflow of contrast becomes visible.

Both mask and fill runs may follow the same acquisition trajectory. The trajectory may cover a small angular range (about 20-40 degrees) with an existing 3D dataset available (e.g., ultrasound, MRA, etc.), or the entire range of a 3D DSA. Such 3D DSA dataset may be acquired if no existing layout of the subject's vasculature is available. Acquisition frame rate may also be varied. With an existing 3D dataset available, sparse time samples may be acquired (e.g., 2-4 frames/s), but can be as high as 30 frames/s. The acquisition frame rate may be limited by the moving speed of the modality.

At 304, the reconstruction unit 207 generates an initial 3D dataset of the one or more vessel-like structures. In some implementations, the reconstruction unit 207 generates an initial 3D dataset from an existing time-varying projection dataset, such as the DSA dataset acquired in step 302. Alternatively, or additionally, the initial 3D dataset may be newly acquired by a CTA, MRA or 3D DSA scan. A registration step may be performed to align existing data with newly acquired data. Such 3D dataset can be combined with a model assumption, such as a gamma-variate curve that models blood flow. In another alternative implementation, the initial 3D dataset is filled with constant intensity values of Hounsfield units (i.e., no time-dependent initial guess).

At 306, the reconstruction unit 207 performs segmentation of the initial 3D dataset to isolate the vessel-like structures (e.g., vascular tree) from the background. Exemplary segmentation techniques include, but are not limited to, fixed value thresholding, region growing, or any other applicable segmentation method.

At 308, the reconstruction unit 207 determines a confidence value for each voxel representing the segmented vessel-like structure in the 3D dataset at each measurement time point. A measurement time point is determined based on a vessel-only image (i.e., fill run projection image subtracted by mask run projection image). A confidence value indicates the reliability of the corresponding estimated voxel value in the 3D dataset. The confidence value may be determined based on the surrounding density of vessel-like structures (e.g., vascular density). More particularly, the confidence value may be a function of the length of the X-ray path that intersects a vessel-like structure for a given pair of source and detector elements (hereinafter "intersection length"), and/or the total number of vessel-like structures intersected along this path. For example, an X-ray beam passing through multiple or thick vascular structures for a given projection image corresponding to time instance 't' may receive a low confidence value.

Figure 4:
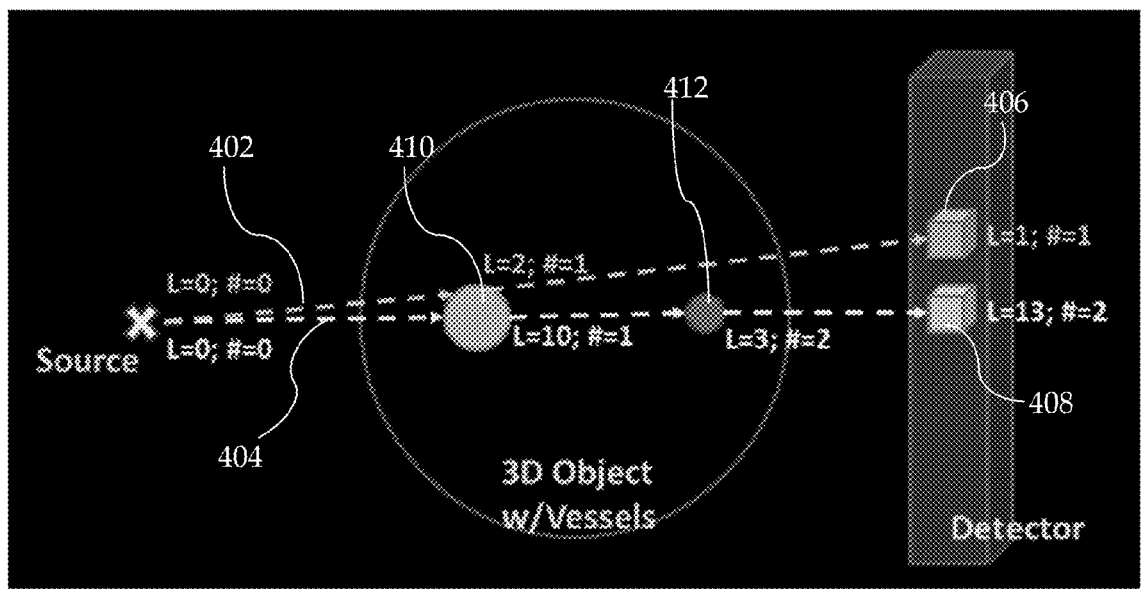
FIG. 4 illustrates determination of an intersection length of a vessel ray-path and number of intersected vessels.

FIG. 4 illustrates the determination of an intersection length (L) of a vessel ray-path and number of intersected vessels (#). Vectors or rays (402 and 404) may be extended from the source to each detector element (406 and 408) at different projection or viewing angles. Each projection or viewing angle is equivalent to a time point t. The length (L) of all voxels traversed in a vessel and/or the number of vessels (#) intersected for each source/detector pixel ray-path in a given projection/viewing angle may be determined. As shown, the ray-path 402 intersects with a small portion of the vessel 410 and not with the vessel 412, yielding a small vessel ray-path length (L=2) and a vessel intersection number (#=1). The ray-path 404 intersects with a large portion of the vessels (410 and 412), yielding a large vessel ray-path length (L=13) and increased vessel intersection count (#=2). Such information may be encoded in a time-resolved 3D dataset using, for example, backprojection. Further, the measurement value in the projection domain representing the contrast concentration at time point t (projection/viewing angle) may also be encoded in the voxel values through backprojection. After processing all vessel voxels and subtracted projections, the result is a time-varying contrast curve and a time-confidence curve per vessel voxel, with potential errors due to vessel overlap and image artifacts.

Figure 5:
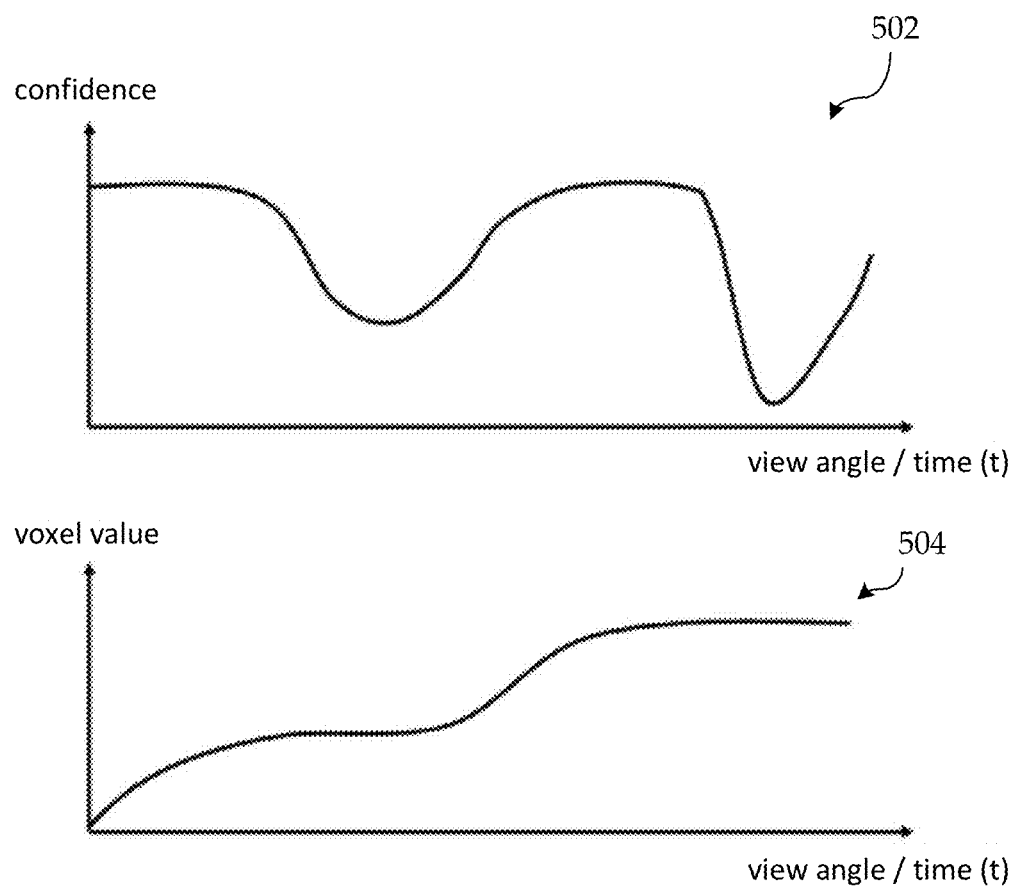
FIG. 5 shows an exemplary time-confidence curve and an exemplary time-contrast curve.

FIG. 5 shows an exemplary time-confidence curve 502 and an exemplary time-contrast curve 504. To generate the exemplary time-confidence curve 502, each voxel within a vessel segment at a given time point t (equivalent to a given projection/viewing angle) may be assigned a confidence value. This confidence value is functionally related to the vessel length (L) and the number of intersecting vessels (#) in the ray path between source and detector elements intersecting the voxel.

The corresponding voxel value is stored for each viewing angle (time point t) to generate the exemplary time-varying contrast concentration curve 504. To determine an initial estimate of the value in the time-contrast curve 504 associated with each vessel voxel, the non-time-varying 3D DSA dataset may be used. At each time point t (projection/viewing angle), the voxel values in the non-time-varying 3D dataset may be replaced with corresponding measurement values from subtracted projection images in the time-varying 2D dataset through a backprojection step. This step may take into account the general reconstruction requirements, such as ray normalization for density and the length of vasculature traversed.

Returning to FIG. 3, at 310, the reconstruction unit 207 determines valid voxels with confidence values above a predetermined threshold value. More particularly, at each time point t (equivalent to projection/viewing angle), voxels with confidence values above a predetermined threshold are identified as 'valid'. Conversely, voxels with confidence values below the threshold are determined as 'invalid'.

Figure 6:
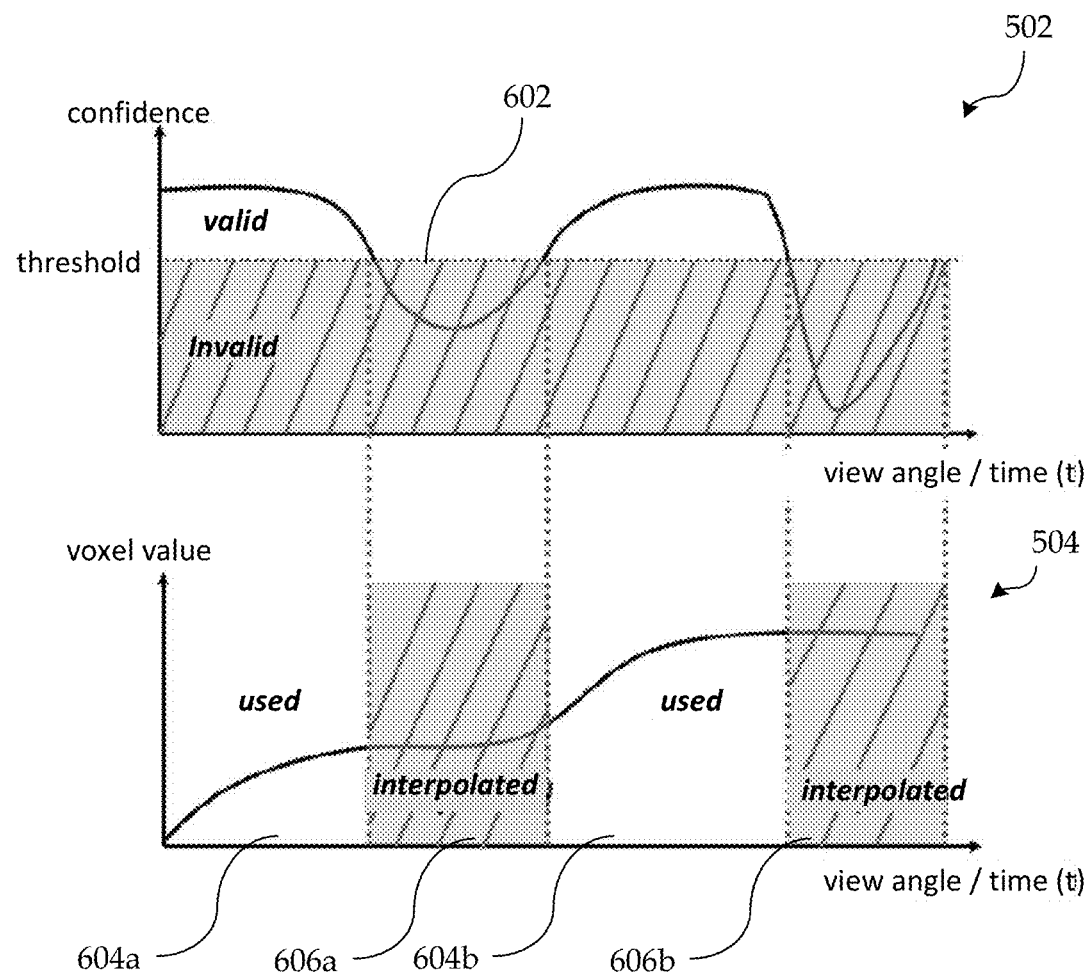
FIG. 6 shows a threshold applied to confidence values of a time-confidence curve.

FIG. 6 shows a threshold 602 applied to the confidence values of the time-confidence curve 502. Voxel values 604a-b associated with reliable voxels are determined and labeled as 'used' in the corresponding time-contrast curve 504. Voxel values 606a-b associated with invalid voxels may be discarded and replaced with interpolated values.

Returning to FIG. 3, at 312, the reconstruction unit 207 corrects values of vessel voxels in the initial or current estimate of the time-varying 3D+t dataset. The resulting time-resolved 3D+t dataset may be displayed to the user as, for example, a volumetric rendering. The time component may be displayed as, for example, a color rendering or time-steps generated during interaction.

In some implementations, only "invalid" vessel voxels of the initial 3D dataset are corrected. Alternatively, most or all vessel voxel values are corrected. The vessel values used for correction may be generated by performing a data interpolation method. The data interpolation method may be performed in the spatial domain and/or the temporal domain. Alternatively, or additionally, the data interpolation method may be weighted by the confidence value associated with each vessel voxel and/or time point. In further implementations, iterative error minimization may be performed to generate the voxel values used for the correction. Such error minimization may be iteratively performed to minimize the error between the estimated 3D+t dataset and acquired projection data.

In accordance with some implementations, spatial interpolation is performed on the initial time-varying 3D (or 3D+t) image dataset to generate interpolated voxel values that may be used to correct invalid voxels in the time-varying 3D (or 3D+t) dataset. For each invalid voxel in the time-varying 3D (or 3D+t) dataset at given time t, all valid voxels in a neighboring spatial region at time t may be determined. The size of the neighboring spatial region may range from two voxels to all active voxels within a predetermined neighborhood size from the currently processed invalid voxel. The voxel value of the invalid voxel may then be interpolated by functionally relating the voxel values of the determined neighboring valid voxels and their respective spatial distances from the invalid voxel.

Figure 7:
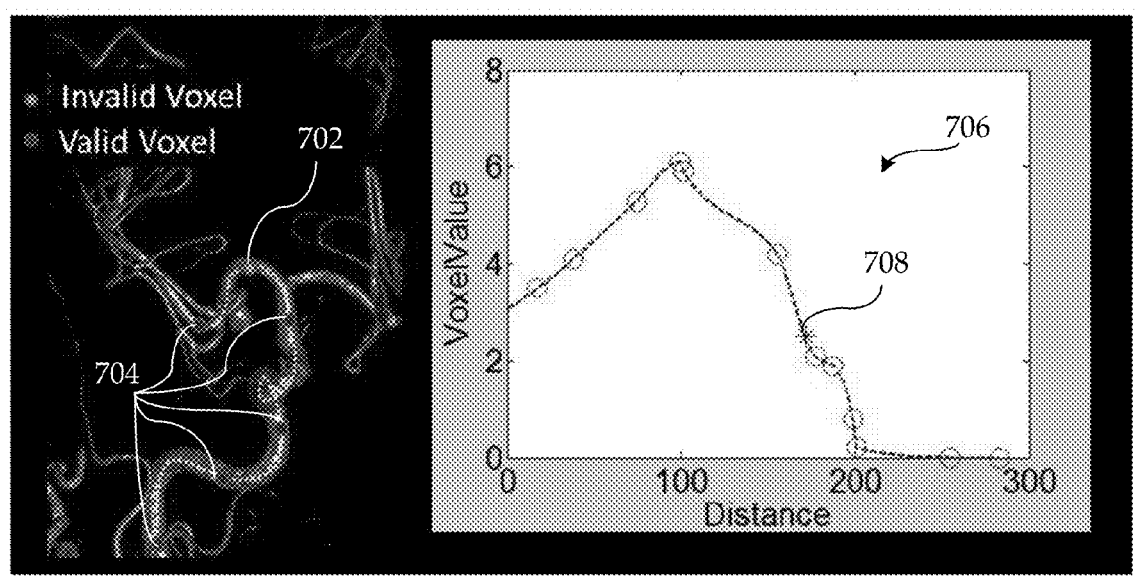
FIG. 7 illustrates an exemplary spatial interpolation.

FIG. 7 illustrates an exemplary spatial interpolation at a given time point t. The known data points generated from valid voxels 704 are interpolated using a distance function. The distance function may be taken from the vessel centerline or a predetermined neighborhood. In the graph 706, circles are known points corresponding to valid voxels 704, while the star 708 is the interpolated point corresponding to an invalid voxel 702. The dotted line indicates the interpolated data, which can be a starting point for iterative refinement.

In accordance with some implementations, temporal interpolation is performed on the initial time-varying 3D (or 3D+t) image dataset to generate interpolated voxel values that may be used to correct invalid voxels in the time-varying 3D (or 3D+t) dataset. For each invalid voxel in the time-varying 3D (or 3D+t) dataset at given time t, the valid voxel in a temporal neighborhood may be determined. It should be appreciated that such voxels are not spatially removed, but are at the same spatial location at previous or future times. The invalid voxel value may be interpolated by functionally relating the voxel values of the temporally neighboring valid voxel and their respective temporal distances from the given time t associated with the invalid voxel.

Figure 8:
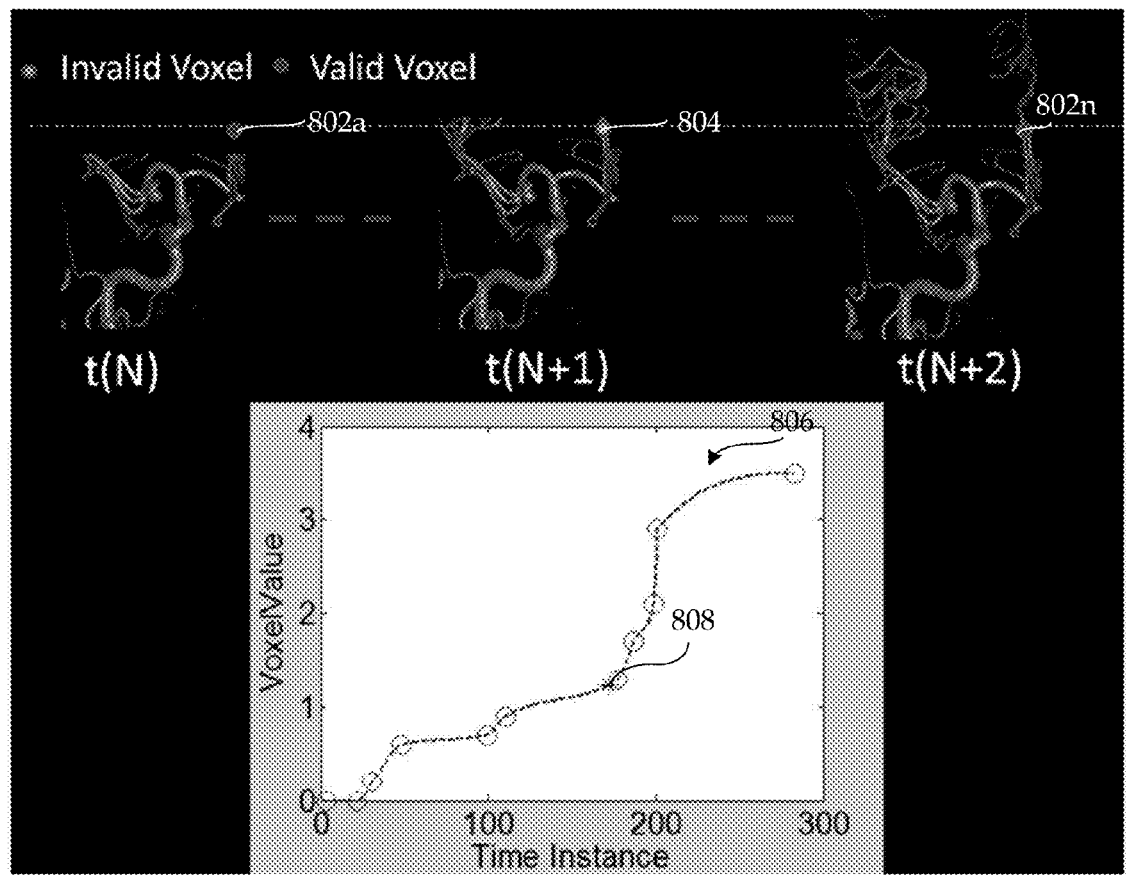
FIG. 8 illustrates an exemplary temporal interpolation.

FIG. 8 illustrates an exemplary temporal interpolation at a given time point t. For a given invalid voxel 804 at time point t, all temporally neighboring valid voxels 802a-n at the same spatial location are determined. The voxel value of the invalid voxel 804 at time point t may then be determined by functionally relating the known voxel values of the valid voxels as a function of their temporal distances. As shown in graph 806, the invalid data-point 808 (indicated by a star) may be determined by functionally relating the known valid data-points (indicated by circles) using their temporal distances (or time instances). The known data points associated with the valid voxels may be interpolated using an interpolation scheme based on the location along the time line using, for example, a cubic spline. The dotted line indicates the interpolated data, which may be a starting point for iterative refinement.

Figure 9:
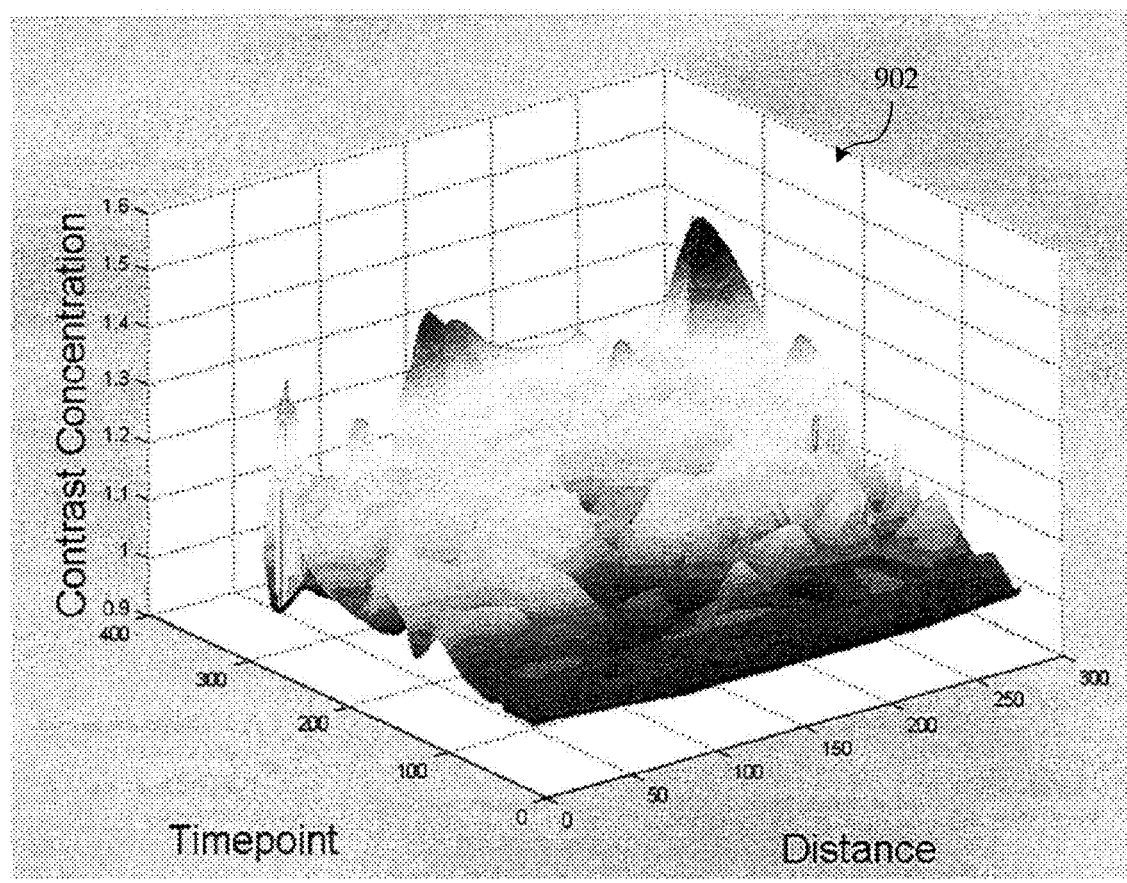
FIG. 9 shows an exemplary 3D map that is generated by spatial and temporal interpolation.

In accordance with further implementations, spatial and temporal interpolation is performed on the initial time-varying 3D image dataset to generate interpolated voxel values that may be used to correct invalid voxels in the time-varying 3D dataset. For each invalid voxel at time t, valid voxels located in a predetermined spatial neighborhood of the invalid voxel and the valid voxel located at the same position in the vessel tree or vasculature but at different time instances within a predetermined temporal neighborhood of the invalid voxel are determined. The voxel value of an invalid voxel may be determined by functionally relating the known voxel values of the valid voxels and their respective spatial and temporal distances from the invalid voxel. FIG. 9 shows an exemplary 3D map 902 that is generated by spatial and temporal interpolation. The 3D map 902 is generated with known data points associated with valid voxels within a spatial neighborhood and a temporal neighborhood.

In accordance with other implementations, confidence weighted interpolation is performed on the initial time-varying 3D image dataset to generate interpolated voxel values that may be used to correct invalid voxels in the time-varying 3D dataset. First, all vessel voxels may be set as "valid". In other words, step 310 need not be performed to determine "valid" voxels. An interpolation neighborhood size may be pre-determined in the spatial and/or temporal domain. Next, for each vessel voxel and each time t, an interpolated value may be determined by functionally relating all voxel values in the spatial and/or temporal neighborhood weighted by spatial and/or temporal distances from the invalid voxel, as well as incorporating the confidence weighting function for each voxel in the neighborhood, such as follows:

$$\hat{f}(x,t) = \frac{\sum_{(y,t') \in N(x,t)} w_T(t,t') \cdot w_s(x,y) \cdot w_c(c(y,t')) \cdot f(y,t')}{\sum_{(y,t') \in N(x,t)} w_T(t,t') \cdot w_s(x,y) \cdot w_c(c(y,t'))} \quad (1)$$

wherein $\hat{f}(x,t)$ is the interpolated voxel value at given spatial position x and time t, N(x,t) is the spatial-temporal neighborhood, $w_T$ is the temporal weighting function, $w_s$ is the spatial weighting function, $w_c$ is the confidence weighting function, and $c(x,t)$ is the confidence value.

In accordance with yet other implementations, iterative confidence weighted interpolation is performed on the initial time-varying 3D image dataset to generate interpolated voxel values that may be used to correct invalid voxels in the time-varying 3D dataset. First, all vessel voxels may be set as "valid". In other words, step 310 need not be performed to determine "valid" voxels. An interpolation neighborhood size may be pre-determined in the spatial and/or temporal domain. Next, an interpolation step is performed. More particularly, for each vessel voxel and each time t, an interpolated value is determined by functionally relating all voxel values in the spatial and/or temporal neighborhood weighted by spatial and/or temporal distances from the invalid voxel, as well as incorporating the confidence weighting function for each voxel in the neighborhood, such as shown in Equation 1.

A regularization function may further be performed across the confidence values to indicate the increased confidence in a voxel value after the interpolation step. The regularization function may be implemented in the form of a local averaging filter configured to increase local confidence, a pre-defined increase in confidence value for all values below a maximum confidence, or based on a neighborhood search where the new confidence of a voxel is taken from the voxel with the next higher confidence. The interpolation and regularization steps may be repeated until a convergence criteria (e.g., minimal change in time-contrast curve, minimal change in confidence values, number of iterations, etc.) is met.

In accordance with some implementations, iterative error minimization is performed to correct voxel values in a current estimated time-varying three-dimensional (3D) dataset. More particularly, forward projection may be used to determine the error between a current estimated 3D+t dataset at each time instance and corresponding projection data from the time-varying two-dimensional (2D) image dataset. Back projection may be used to distribute the error determined at each time point t to the current estimated 3D+t dataset. Following the error minimization step, the current estimated 3D+t dataset may be regularized using, for instance, a smoothing filter function. By iteratively alternating the error estimation and distribution step and the regularization step until a terminating condition is met, temporal data is encoded into the 3D+t volumetric dataset. Alternatively, the regularization step may be mathematically encoded into a cost function to be optimized, which then covers both error estimation/redistribution and regularization.

Error minimization may be performed by first denoting the time-resolved data as $n=n_0, n_1, n_2, \ldots, n_t$. Next, minimization of the error function $f(n)$ is represented as follows:

$$\tilde{n} = \arg\min f(n) \quad (2)$$

$$\text{wherein } f(n) = \Psi_1 \|An - y\| + \Psi_2 \|g(n)\| \quad (3)$$

Here, A represents the system matrix describing the geometric relationship between reconstructed data and time-resolved log-subtracted X-ray projection data set y (i.e., data constraint). The regularization function $g(n)$ is applied to the time-resolved reconstruction results. The regularization function may take a variety of forms, and can be used to minimize noise in the reconstruction or to create a smooth transition in between the individual time-resolved volumes x, e.g. $g(n) = \|\nabla n\|$. The weights $\Psi_i$ between the data constraint and the regularization function may be adjusted to either focus on a close approximation of the reconstructed image with respect to the measured projection data derived from the 2D image dataset, or to achieve a smooth transition of time-resolved vascular volumes between time instances in the estimated 3D dataset. Direct inversion of this ill-posed problem may not be possible, and equation (2) may be iteratively minimized using a numerical optimization technique (e.g. steepest descent, Newton's method, etc.)

Figure 10:
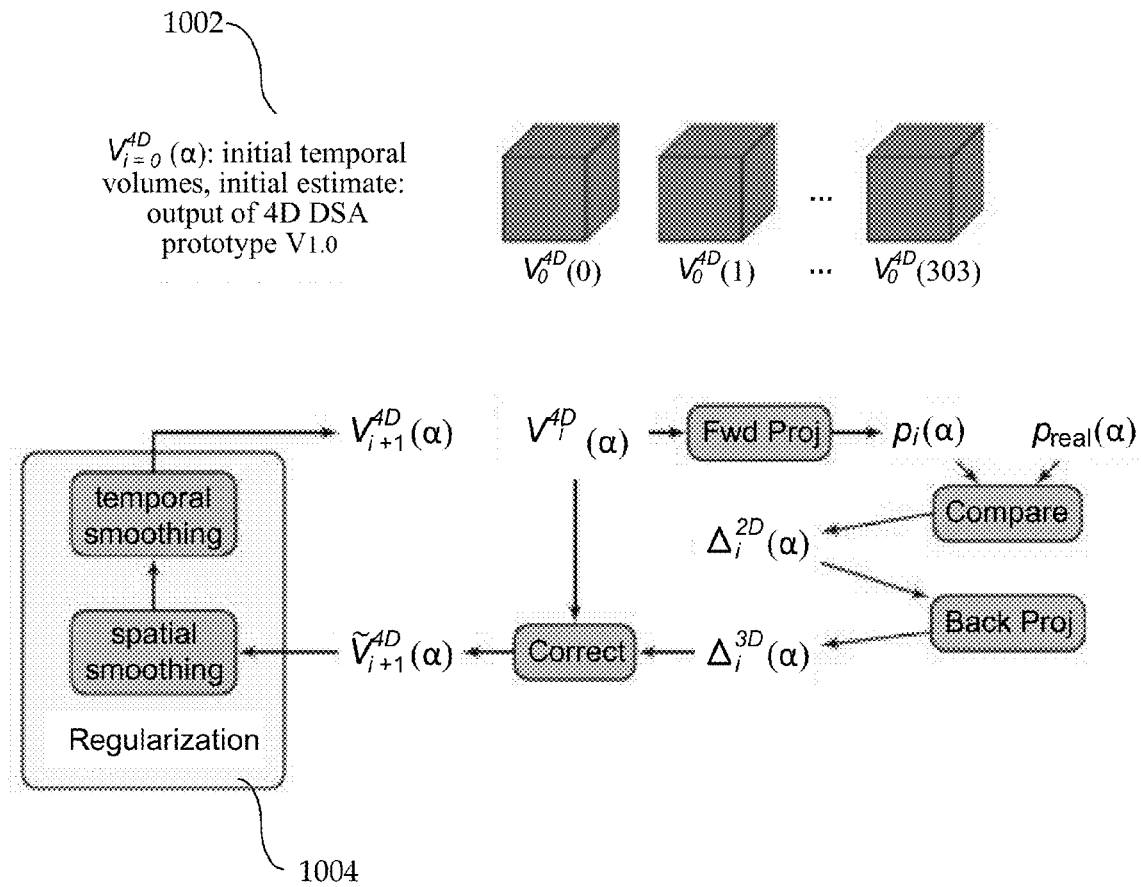
FIG. 10 shows an exemplary implementation of an iterative error minimization process.

FIG. 10 shows an exemplary implementation of the iterative error minimization process. This exemplary approach of adding difference volumes to iteratively improve the estimates of a reconstruction result is similar to the simultaneous algebraic reconstruction technique (SART). However, SART does not reconstruct time-dependent datasets or provide regularization in space and time.

As shown, the upper row 1002 represents an initial estimate of the 3D+t dataset. The initial estimate may include a set of temporal volumes $V_{i=0}^{4D}(\alpha)$, wherein $\alpha$ indicates the time step. The example as shown covers time-dependent vascular 3D datasets corresponding to 304 time instances. During the iterative process, each of the temporal volumes $V_i^{4D}(\alpha)$ is numerically forward-projected, resulting in a 2D image of line integrals of X-ray attenuation coefficients $p_i(\alpha)$. The coefficients $p_i(\alpha)$ may then be compared against the acquired log-subtracted projection data $p_{real}(\alpha)$. The resulting difference image $\Delta_i^{2D}(\alpha)$ is then back-projected into the 3D space and used to correct the current temporal volume $\tilde{V}_{i+1}^{4D}(\alpha)$. After this correction has been done for all temporal volumes, the spatial-temporal regularization step 1004 is performed.

In accordance with other implementations, iterative confidence-weighted error minimization is performed to correct the voxels in the initial 3D dataset. Such implementation may include the use of data confidence and reliability measures previously derived in, for example, steps 308 and 310 (as shown in FIG. 3). As discussed previously, the confidence value of a voxel at time point t may be determined as a function of the density of the vascular network surrounding the voxel. For example, an X-ray beam passing through multiple or thick vascular structures for a given projection image (corresponding to time instance 't') may receive a low confidence value.

The error minimization process may then be performed iteratively. First, time-resolved data may be denoted as $n=n_0, n_1, n_2, \ldots, n_t$. Next, the error function $f(n)$ may be minimized as follows:

$$\tilde{n} = \arg\min f(n) \quad (4)$$

$$\text{wherein } f(n) = f(\|An - y\|, c) \quad (5)$$

and the update in n may be described as:

$$n_{i+1,t} = n_{i,t} + f(c_t, e_t). \quad (6)$$

Here, $n_{i,t}$ describes the 3D+t volume estimate at iteration i at time point t. The function $f(c_t, e_t)$ weighs the backprojected error between the current estimate $n_{i,t}$ and projection measurement $y_t$ at time t with the confidence value $c_t$ of a given voxel at time point t. In other words, the error between the current estimate $n_{i,t}$ and the projection measurement $y_t$ determined in the projection domain is distributed back into the 3D+t estimate at time t by inverse weighting of the confidence value $c_t$.

Voxels with high confidence values may receive only a small amount of distributed error. Error distribution may be increased with decreasing voxel confidence value. For example, an inverse linear correlation may be applied between confidence value and error distribution, assuming there are only two active voxels in the source-detector pixel ray path. Voxel A has a confidence value of 0.9, Voxel B has a confidence value of 0.1. With a linear inverse relationship, Voxel A may only receive 10% of the error distribution, while Voxel B may receive 90% of the error distribution. Following the update of the voxels, the data may be regularized using either a filter method, such as Gaussian or joint-bilateral filtering, or a function of the form $g(n)=\|\nabla n\|$.

Figure 11:
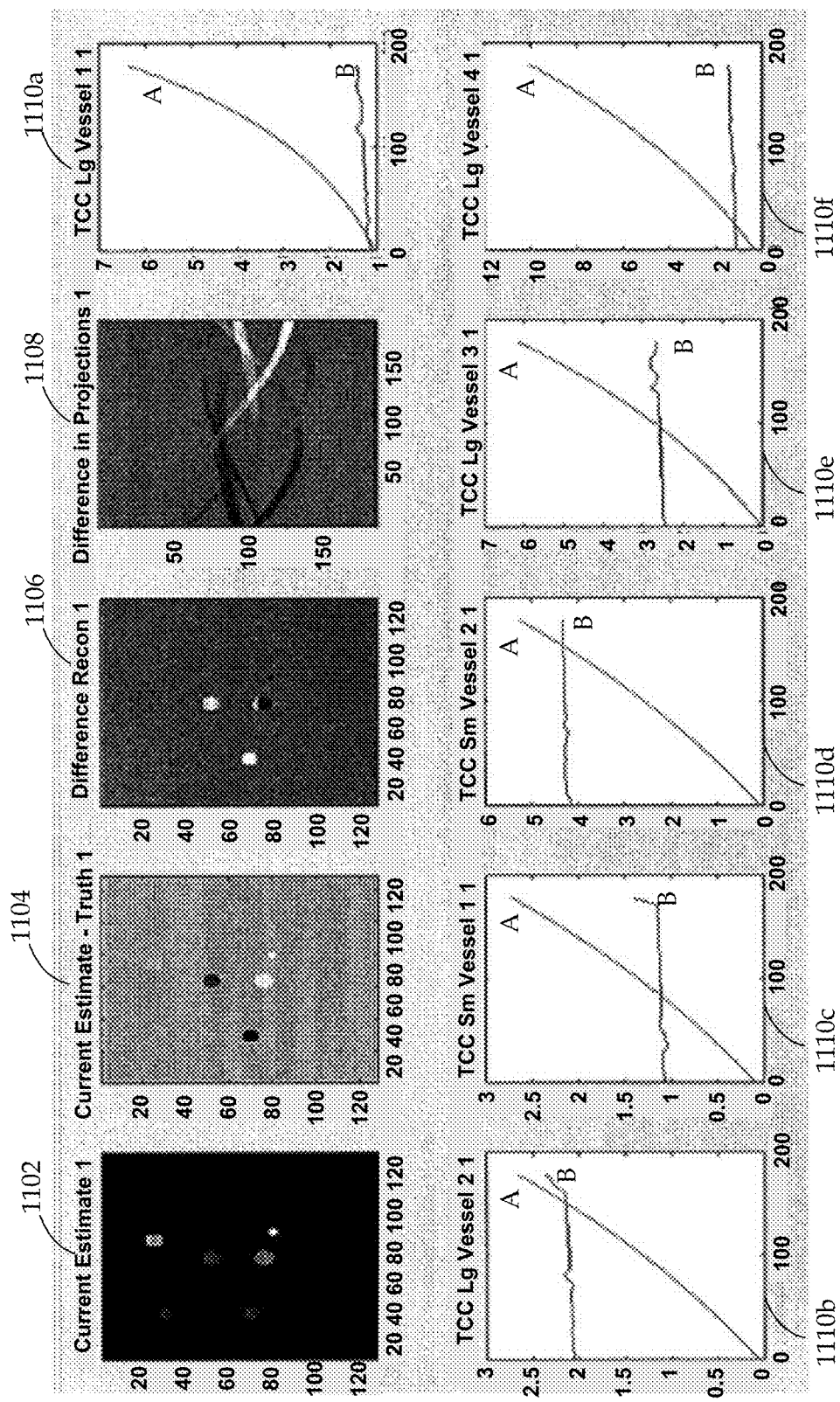
FIG. 11 shows simulation results of an exemplary iterative reconstruction of time concentration curves (TCC) after one iteration.

FIG. 11 shows simulation results of an exemplary iterative reconstruction of time concentration curves (TCC) after one iteration. Graph 1102 shows the current estimate of the volume at time point t. Graph 1104 shows the error between the ground truth and the current estimate of the volume at time point t. Graph 1106 shows the reconstruction of the difference (forward projected current estimate minus the actual measurement). Graph 1108 shows the difference in projection space. Graphs 1110*a-f* show the TCCs in six vessels, where line A indicates the ground truth and line B indicates the current estimate. Since the starting estimate is merely an average of the measured data, there is a large discrepancy in the TCCs (A and B).

Figure 12:
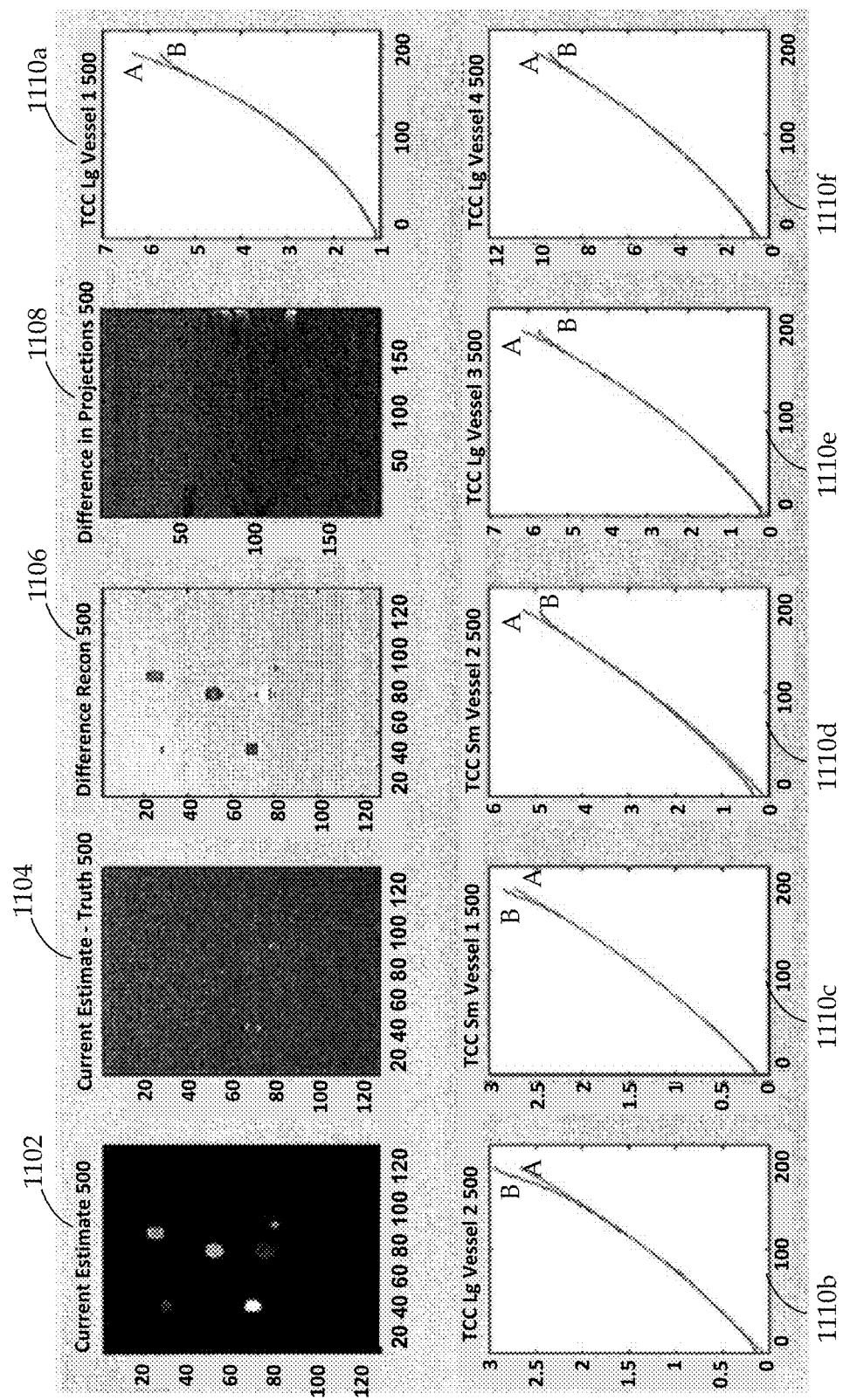
FIG. 12 shows simulation results of an exemplary iterative reconstruction of time concentration curves (TCC) after 500 iterations.

FIG. 12 shows simulation results of an exemplary iterative reconstruction of time concentration curves (TCC) after 500 iterations. Graph 1102 shows the current estimate of the volume at time point t. Graph 1104 shows the error between the ground truth and the current estimate of the volume at time point t. Graph 1106 shows the reconstruction of the difference (forward projected current estimate minus the actual measurement). Graph 1108 shows the difference in projection space. Graphs 1110*a-f* show the TCCs in six vessels, where line A indicates the ground truth and line B indicates the current estimate. It can be observed that the resulting TCCs (A and B) are very similar.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed:

1. A non-transitory computer readable medium embodying a program of instructions executable by machine to perform steps for facilitating iterative data reconstruction, the steps comprising:
   (i) receiving a time-varying two-dimensional (2D) image dataset of one or more structures of a biological object of a patient;
   (ii) forward projecting temporal volumes in a current estimated time-varying three-dimensional (3D) dataset to obtain 2D attenuation coefficients, and determining an error between the 2D attenuation coefficients corresponding to the current estimated time-varying 3D dataset and corresponding projection data from the received time-varying 2D image dataset; and
   (iii) back projecting the error across the temporal volumes in the current estimated time-varying 3D dataset to adjust the current estimated time-varying 3D dataset.

2. The non-transitory computer readable medium of claim 1 further comprising the step of:
   (iv) applying a function to the adjusted current estimated time-varying 3D dataset.

3. The non-transitory computer readable medium of claim 2 further comprising the step of:
   (v) repeating at least steps (ii), (iii) and (iv) until a terminating condition is met.

4. A system for data reconstruction, comprising:
   a non-transitory memory device for storing computer readable program code; and
   a processor in communication with the memory device, the processor being operative with the computer readable program code to:
   generate a time-varying projection image dataset of one or more structures of a biological object of a patient;
   generate a time-varying three-dimensional (3D) image dataset of the one or more structures from the time-varying projection image dataset;
   perform data interpolation on the time-varying 3D image dataset to generate at least one interpolated voxel value; and
   correct, with the interpolated voxel value, at least one value of a voxel representing the one or more structures in the time-varying 3D dataset.

5. The system of claim 4 wherein the processor is further operative with the computer readable program code to perform segmentation on the time-varying 3D dataset to isolate the one or more structures from the background.

6. The system of claim 4 wherein the processor is operative with the computer readable program code to correct the value of the voxel in response to a determination that a confidence value associated with the voxel is below a predetermined threshold.

7. The system of claim 6 wherein the processor is operative with the computer readable program code to determine the confidence value based on an intersection length of a ray path, a number of structures intersected by the ray path, or a combination thereof.

8. The system of claim 7 wherein the processor is operative with the computer readable program code to generate a time-confidence curve and a time-contrast curve after determining confidence values associated with multiple voxels at different measurement time points.

9. The system of claim 4 wherein the processor is operative with the computer readable program code to perform the data interpolation in a spatial domain.

10. The system of claim 9 wherein the processor is operative with the computer readable program code to perform the data interpolation in the spatial domain by determining valid voxels in a neighboring spatial region of an invalid voxel, and determining the interpolated voxel value by functionally relating values of the valid voxels and their respective spatial distances from the invalid voxel.

11. The system of claim 4 wherein the processor is operative with the computer readable program code to perform the data interpolation in a temporal domain.

12. The system of claim 11 wherein the processor is operative with the computer readable program code to perform the data interpolation in the temporal domain by determining valid voxels in a neighboring temporal region of an invalid voxel, and determining the interpolated voxel value by functionally relating values of the valid voxels and their respective temporal distances.

13. The system of claim 4 wherein the processor is operative with the computer readable program code to perform the data interpolation in a spatial domain and a temporal domain.

14. The system of claim 13 wherein the processor is operative with the computer readable program code to perform the data interpolation in the spatial and temporal domains by determining first valid voxels in a neighboring spatial region of an invalid voxel, determining second valid voxels in a neighboring temporal region of the invalid voxel, and determining the interpolated voxel value by functionally relating values of the first and second valid voxels and their respective spatial and temporal distances.

15. The system of claim 4 wherein the processor is operative with the computer readable program code to perform the data interpolation by performing confidence weighted interpolation.

16. The system of claim 15 wherein the processor is operative with the computer readable program code to perform the confidence weighted interpolation by functionally relating voxel values in a pre-determined spatial or temporal neighborhood weighted by spatial or temporal distances, and incorporating a confidence weighting function for each voxel in the neighborhood to generate the interpolated voxel value.

17. The system of claim 15 wherein the processor is operative with the computer readable program code to iteratively repeat the confidence weighted interpolation and a regularization step until a convergence criteria is met.

18. A method of iterative data reconstruction, comprising:
(i) receiving, by a processor, a time-varying two-dimensional (2D) image dataset of one or more structures of a biological object of a patient;
(ii) forward projecting, by the processor, temporal volumes in a current estimated time-varying three-dimensional (3D) dataset to obtain 2D attenuation coefficients, and determining an error between the 2D attenuation coefficients corresponding to the current estimated time-varying 3D dataset and corresponding projection data from the received time-varying 2D image dataset; and
(iii) back projecting, by the processor, the error across the temporal volumes in the current estimated time-varying 3D dataset to adjust the current estimated time-varying 3D dataset.

19. The method of claim 18 further comprising:
(iv) applying, by the processor, a function to the adjusted current estimated time-varying 3D dataset.

20. The method of claim 19 further comprising:
(v) repeating at least steps (ii), (iii) and (iv) until a terminating condition is met.

21. The method of claim 18 further comprising performing, via an imaging device, a single mask and fill acquisition to generate the time-varying 2D image dataset.

22. The method of claim 18 further comprising setting the estimated time-varying 3D dataset to an initial volume dataset with constant intensity values.

23. The method of claim 19 wherein the function is a regularization function configured to minimize noise in the estimated time-varying 3D dataset.

24. The method of claim 19 wherein the function is a regularization function configured to achieve smooth transitioning of time-resolved volumes between time instances in the estimated time-varying 3D dataset.

25. The method of claim 18 wherein back projecting the error comprises applying an inverse weighting of confidence values associated with the temporal volumes.

26. The method of claim 25 further comprising determining the confidence values based on an intersection length of a ray path, a number of structures intersected by the ray path, or a combination thereof.

27. The method of claim 18 further comprising displaying the estimated time-varying 3D dataset as a volumetric rendering, wherein the volumetric rendering includes a color rendering of a time component of the estimated time-varying 3D dataset.

* * * * *

UNITED STATES PATENT AND TRADEMARK OFFICE
CERTIFICATE OF CORRECTION

PATENT NO. : 9,754,390 B2  
APPLICATION NO. : 15/233288  
DATED : September 5, 2017  
INVENTOR(S) : Benno Heigl et al.

Page 1 of 1

It is certified that error appears in the above-identified patent and that said Letters Patent is hereby corrected as shown below:

In the Claims

Column 14, Claim 5, Line 25, "from the background" should read "from a background."

Signed and Sealed this
Twenty-fourth Day of September, 2019

Andrei Iancu
*Director of the United States Patent and Trademark Office*